United States Patent [19]

Yoshimatsu

[11] Patent Number: 4,506,370

[45] Date of Patent: Mar. 19, 1985

[54] ARC FURNACE INSTALLATION WITH SHROUD

[75] Inventor: Yoshiaki Yoshimatsu, Kure, Japan

[73] Assignee: Ishikawajima-Harima Jukogyo Kabushiki Kaisha, Japan

[21] Appl. No.: 511,175

[22] Filed: Jul. 6, 1983

[30] Foreign Application Priority Data

Feb. 28, 1983 [JP] Japan .................. 58-28734[U]

[51] Int. Cl.³ .................. F27D 7/00; F27D 17/00
[52] U.S. Cl. .................. 373/8; 373/9; 373/80
[58] Field of Search .................. 373/8, 9, 80, 24

[56] References Cited

U.S. PATENT DOCUMENTS 3,938,788  2/1976  Josten .................. 373/9
4,385,889  5/1983  Yasukawa .................. 373/80 X
4,402,083  8/1983  Paskarbeit et al. .................. 373/9
4,437,186  3/1984  Inai .................. 373/9

Primary Examiner—A. D. Pellinen
Assistant Examiner—Susan Steward

[57] ABSTRACT

An arc furnace installation wherein the arc furnace is air-tightly enclosed with a shroud and a scrap preheating chamber moves into or out of the shroud in such a way that the preheating chamber may be selectively brought to a position immediately above the arc furnace, a scrap preheating position spaced apart from the arc furnace by a predetermined distance and a scrap charging position outside of the shroud. The number of openings of the shroud may be reduced to a minimum and consequently the total area of the openings may be minimized.

7 Claims, 5 Drawing Figures

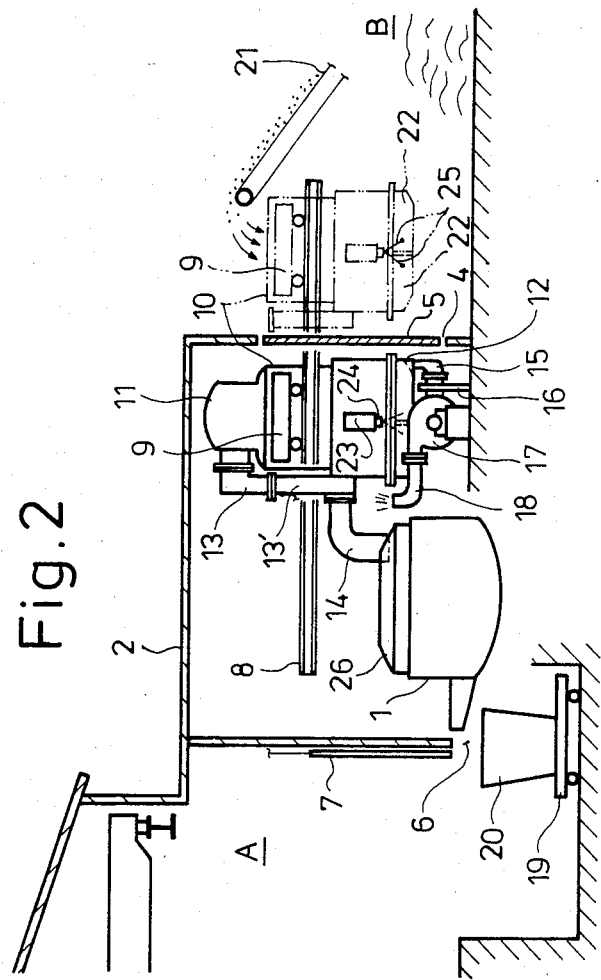

ARC FURNACE INSTALLATION WITH SHROUD

BACKGROUND OF THE INVENTION

The present invention relates to an arc furnace installation with a shroud or enclosure.

The energy problem, the improvements of working conditions and the environmental pollution controls such as noise and dust controls have recently become severer and the operation of the steel-making arc furnace must be carried out under these severe conditions.

For instance, in order to prevent the atmospheric air pollution by gases exhausted when ores are charged into an arc furnace and molten steel is discharged from it, a ventilation type dust collection system has been employed. That is, the exhaust gases are sucked so that dust particles entrained in the exhaust gases are removed and consequently dust-free gases are discharged into the surrounding atmosphere. However because the ceiling of a steel foundry is high so that smoke and fume are diffused in the air and because the steel foundry has many wide openings, large-sized fans must be installed in order to suck a large quantity of smoke and air as well. Thus the prior art dust collection system has the problems that the system is large in size and the efficiency of the dust collection system is low.

In the case of a large- or intermediate-sized arc furnace, direct suction of exhaust gases is effected during energization. The sucked exhaust gases contain large quantity of CO (carbon monoxide). Therefore, in order to prevent the explosion, a combustion tower or column must be installed to burn CO. This results in generation of large quantities of $NO_x$ (nitrogen oxide).

Meanwhile, noise produced during the operation of an arc furnace reaches as high as 120 dBA so that the operators suffer from occupational diseases; that is, they have difficulty in hearing. In addition, smoke and dust particles discharged from the arc furnace considerably adversely affect the working conditions.

In order to solve these problems, there has been proposed and demonstrated a method for enclosing an arc furnace with a shroud so that it suffices only to suck the exhaust gases from the shroud and the suction of the surrounding air can be minimized because the arc furnace is air-tightly sealed. As a result, as compared with the conventional dust collection systems, the suction rate can be reduced to less than one half and the ventilation or suction system can be reduced in size accordingly. Since the arc furnace is totally enclosed with the shroud, the exhaust gases are burned with the air supplied to the furnace so that the temperature of the exhaust gases drops and the quantities of $NO_x$ are reduced accordingly. In addition, noise can be shut off and the leakage of dust particles to the exterior can be prevented. Thus, the working conditions can be remarkably improved.

When the arc furnace is enclosed with the shroud, the raw materials are once charged by a bucket suspended from a crane into the shroud and then charged into the arc furnace.

Therefore, when an arc furnace is enclosed with a shroud a, the shroud is provided with an opening b as shown in FIG. 1 through which a bucket is moved into or out of the shroud a and which may be closed with doors c. In addition, the roof of the shroud a is provided with a slit-like opening d so that a rope which hangs the bucket may move through the opening d. Therefore, there must be no obstacle which prevents the passage of the rope along the opening d. Furthermore, a sliding door e is provided so as to close the opening d.

Since the shroud a is provided with many openings such as the side and top openings b and d the overall rigidity of the shroud a is considerably decreased so that the shroud a must be constructed with materials having a higher degree of rigidity. As a result, the cost becomes high. Furthermore, in order to air-tightly seal the openings b and d, the shroud a must be constructed with a high degree of precision. For instance, an air curtain must be provided in order to prevent the leakage of smoke from the shroud a, but it is extremely difficult to completely prevent the suction of the surrounding air into the shroud a. As a result, a high-capacity ventilation or suction system must be installed. Furthermore there arises the problem that the operation efficiency is relatively low because the heavy doors c and e must be moved. In addition, an extremely high degree of skill is required for passing the bucketsuspending rope through the slit-like opening d in the roof. If the rope is not correctly moved along the elongated opening d, the bucket suspended therefrom would collide against the shroud a, causing damage to it.

When the scrap or the metal charge is charged, combustibles including impurities are also charged into the arc furnace at high temperature so that the quantities of smoke evolved are increased and smoke is blown up in large quantities above the arc furnace by the ascending air. Consequently, smoke tends to leak out of the shroud.

Meanwhile, toward the end of the melting stage and during the refining stage, exhaust gases at extremely high temperatures are discharged from the arc furnace. Therefore, when such high-temperature exhaust gases are passed through a bag filter, the latter is inevitably damaged. As a result, the high-temperature exhaust gases must be cooled before they enter the bag filter. From the standpoint of energy savings, such cooling systems have been widely used because heat recovered from the exhaust gases may be used to preheat scraps so that the cost of electric power for melting a unit weight of scraps may be reduced and consequently the steel production cost can be decreased accordingly.

The exhaust gases discharged from the arc furnace contain a large quantity of CO which is burned outside the furnace. In the case of a direct suction system, in order to prevent the explosion, a combustion tower or column must be installed to burn CO. After the combustion of CO, the exhaust gases are cooled. Thus, the prior art arc furnace installation needs various equipments.

The operation for preheating the scraps before they are charged into the arc furnace has long been carried out. Since the prior art preheating devices occupy a large installation space, they are installed exterior of and spaced apart from the arc furnace. As a result, the temperature of the preheated scraps drops considerably before they charged into the arc furnace. In addition, the high-temperature scraps are transported in a scrap bucket suspended from a crane while smoke and offensive odor are emitted. Furthermore, cranes for transporting and charging scraps are needed, and a long duct must be extended to the preheating device. Moreover, since the preheating device is installed within the steel foundry, a bypass system or circuit must be installed so that only from 30 to 40% of the exhaust gases may be satisfactorily utilized.

The present invention was made to overcome the above and other problems encountered in the prior art arc furnaces. One of the objects of the present invention is therefore to enclose a preheating chamber for preheating raw materials with a shroud in such a way that the preheating chamber can be moved into or out of the shroud through one side wall thereof in the horizontal direction, whereby the number of openings of the enclosure may be reduced to a minimum and the area of the openings can be also decreased accordingly.

Another object of the present invention is to preheat the raw materials by the exhaust gases discharged from an arc furnace, whereby the problems in the case of the preheated raw materials transported and charged into the furnace can be solved.

The present invention will become more apparent from the following description of the preferred embodiments thereof taken in conjunction with the accompanying drawings.

BRIEF DESCRIPTION OF THE DRAWINGS

FIGS. 2 and 3 are views used for explanation of a first embodiment of the present invention, the former showing the stages for charging raw materials into a preheating chamber and for preheating them therein and the latter showing the stage for charging the preheated raw materials into an arc furnace;

Same reference numerals are used to designate similar parts throughout the figures.

DESCRIPTION OF THE PREFERRED EMBODIMENTS

Figure 1:
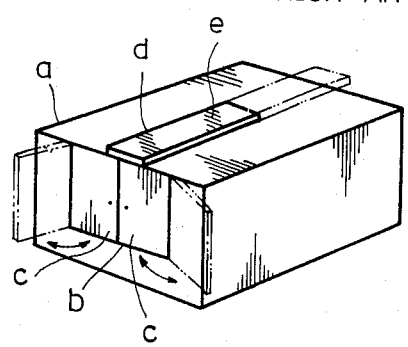
FIG. 1 is a perspective view of a prior art arc-furnace shroud.

As shown in FIG. 2, an arc furnace 1 is enclosed with a shroud 2 in the open air between a casting yard A and a scrap yard B, and the side wall of the shroud 2 on the side of the scrap yard B is provided with an opening 4 through which a scrap preheating chamber 10 is moved into or out of the shroud 2. The opening 4 is adapted to be closed with a door 5. The side wall on the side of the casting yard A is provided with an opening 6 so that the molten steel discharged from the arc furnace 1 may be transported from the shroud 2 to the casting yard A. The opening 6 is adapted to be closed with a door 7. A horizontal rail 8 is extended through the shroud 2 and toward the scrap yard B and a carriage 9 which suspends the scrap preheating chamber 10 rides on the rail 8 so that as the carriage 9 is moved into or out of the shroud 2, the scrap preheating chamber 10 is also moved into or out of the shroud 2 and can be brought immediately above the arc furnace 1.

Figure 3:
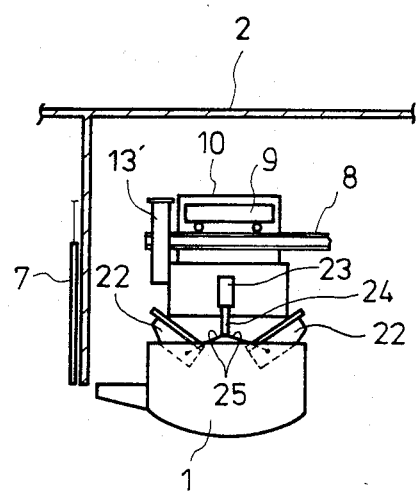

The bottom of the scrap preheating chamber 10 consists of two split bottom parts 22 the outer ends of which are pivoted to the lower end of the main body of the scrap preheating chamber 10 as best shown in FIG. 3 so that the bottom of the scrap preheating chamber 10 may be opened as shown in FIG. 3 or closed as best shown in FIG. 2. The free or inner ends of the split-bottom parts 22 are connected to one end of wire ropes 25 the other ends of which are in turn connected to a piston rod 24 of a power cylinder 23. Therefore, when the piston rod 24 is extended the bottom parts 22 are opened or separated from each other, but when the piston rod 24 is extracted the bottom parts 22 are tightly closed.

At a preheating position (indicated by the solid lines in FIG. 2), the scrap preheating chamber 10 is adapted to engage with a roof 11 and a seal cover 12. The roof 11 is communicated with the arc furnace 1 through a duct 13, a suction duct 13' and a dust collection elbow 14. On the other hand, the seal cover 12 is communicated through an exhaust duct 15 and a dust collector 16 with a fan 17 which in turn is communicated with an exhaust duct 18. Therefore when the fan 17 is driven, the exhaust gases are sucked through the dust collection elbow 14, the suction duct 13' and the duct 13 into the scrap preheating chamber 10 and after the exhaust gases preheat the metal charge in the scrap preheating chamber 10, they are discharged through the seal cover 12, the exhaust duct 15, the dust collector 16, the fan 17 and the exhaust duct 18 into the shroud 2.

A carriage 19 upon which is mounted a ladle 20 is adapted to move between the shroud 2 and the casting yard A at a level below the arc furnace 1. The molten metal is charged or poured from the arc furnace 1 into the ladle 20 on the carriage 19 and the carriage 19 transports the ladle 20 to the casting yard A. At the casting yard A, the ladle 20 is lifted by means of a crane to a casting position.

Reference numeral 21 denotes a conveyor through which the scrap is charged from the scrap yard A into the empty preheating chamber 10; and 26, a furnace top.

In operation, the door 5 is opened and the scrap preheating chamber 10 is moved out of the shroud 2 into the scrap yard B as indicated by the two-dot chain lines in FIG. 2. Thereafter the scrap is charged into the scrap preheating chamber 10 by means of the conveyor 21. After the scrap preheating chamber 10 is fully charged with scrap, the carriage 9 is driven so that the scrap preheating chamber 10 is moved into the shroud 2 and then the door 5 is closed. After the scrap preheating chamber 10 has been brought to its preheating position, it engages with the roof 11 and the seal cover 12 and then the fan 17 is driven so that the high-temperature exhaust gases are sucked or exhausted through the dust collection elbow 14, the suction duct 13' and the duct 13 into the roof 11 and consequently into the scrap preheating chamber 10. As a result, the metal charge or scrap in the preheating chamber 10 is preheated by the heat liberated from the high-temperature exhaust gases. Thereafter the exhaust gases are discharged through the seal cover 12, the exhaust duct 15, the dust collector 16, the fan 17 and the exhaust duct 18 into the shroud 2. In the shroud 2 the discharged exhaust gases are dilluted with the air and are exhausted through a dust collection hood (not shown). Therefore the danger of explosion is decreased and the temperature of CO is so dropped that it cannot burn. The concentration of CO is also reduced because it is mixed with the air. Thus the carbon monoxide can be safely processed and the production of $NO_x$ can be minimized.

After the metal charge or scrap in the preheating chamber 10 has been preheated to a predetermined temperature, the carriage 9 is driven so that the scrap preheating chamber 10 is brought to the position immediately above the arc furnace 1 and the bottom of the preheating chamber 10 is opened so that the preheated scrap is charged into the arc furnace (See FIG. 3). After the scrap preheating chamber 10 has been completely emptied, it is moved along the horizontal rail 8 toward the scrap yard B so that new scrap may be charged into the scrap preheating chamber 10 in the manner described before.

The molten metal is charged from the arc furnace 1 into the ladle 20 on the carriage 19. The carrier 19 transports the ladle 20 to the casting yard A and then the ladle 20 is lifted to the casting position in the manner described before. During the movement of the carriage 19 out of or into the shroud 2, the door 7 of the opening 6 is of course kept opened.

So far it has been described that in the scrap yard B the scrap is charged into the empty preheating chamber 10 by means of the conveyor 21, but it is to be understood that any other suitable scrap charging means such as a skip conveyor, a magnet lifting device or the like may be employed. Furthermore, the scrap preheating position has been described as being located within the shroud 2, but it is to be understood that it may be located outside of the shroud 2.

Figure 4:
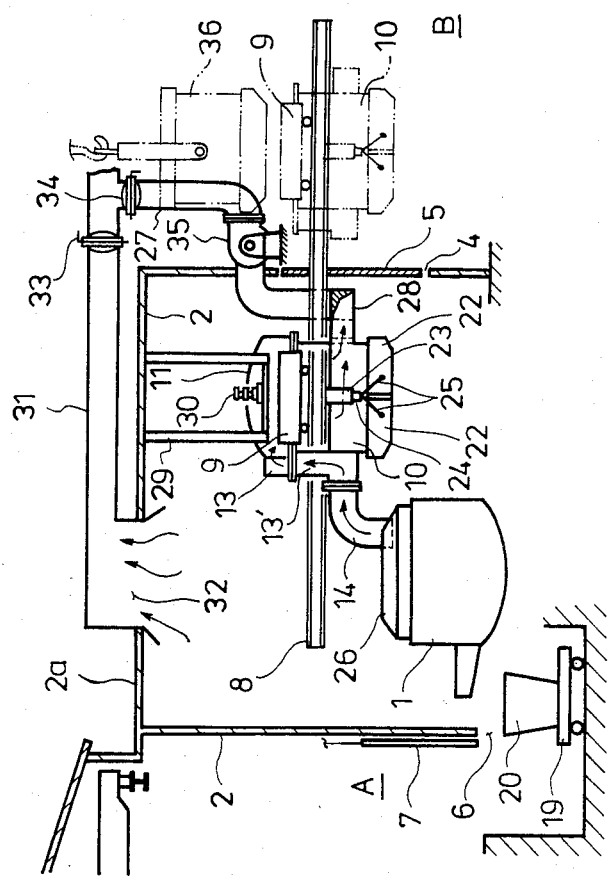
FIG. 4 shows a second embodiment of the present invention.

FIG. 4 shows a second embodiment of the present invention in which an exhaust-gas suction duct 13' is attached to the outer side wall of the scrap preheating chamber 10 on the side of the arc furnace 1. The lower end of the suction duct 13' is adapted to detachably engage with the upper end of the elbow 14 extended from a top 26 of the arc furnace 1 and the upper end of the suction duct 13' is adapted to detachably engage with the lower end of a duct 13 attached to a cover 11 of the scrap preheating chamber 10. The scrap preheating chamber 10 is also provided with an exhaust port 28 which is adapted to detachably engage with the lower end of an exhaust duct 27 which in turn is extended in such a way that the movement of the scrap preheating chamber 10 may not be prevented.

A supporting structure 29 is suspended from the roof 2a of the shroud 2 immediately above the position of the scrap preheating chamber 10 when the operation of the arc furnace 1 is carried out. The roof 11 of the scrap preheating chamber 10 is supported by the supporting structure 29 in such a way that the roof 11 can be moved vertically along the supporting structure 29 by means of a power cylinder 30. Therefore, when the piston rod of the power cylinder 30 is extended, the roof 11 can air-tightly seal the upper opening of the scrap preheating chamber 10.

A ventilation hole 32 of a ventilation flue 31 is opened at the roof 2a of the shroud 2 and the ventilation flue 31 is communicated with the exhaust duct 27 which in turn can be detachably communicated with the exhaust port 28 of the scrap preheating chamber 10. Dampers 33 and 34 are disposed in the ventilation flue 31 and the exhaust duct 27, respectively, in order to control the flow rates of gases discharged through them. A fan 35 is also disposed within the exhaust duct 27 so as to increase the pressure, thereby compensating for the pressure loss between scraps.

Next the mode of operation of the second embodiment will be described. FIG. 4 shows that the metal charge or scrap is being preheated. That is, the roof 11 air-tightly seals the top opening of the scrap preheating chamber 10 so that the arc furnace 1 and the roof 11 of the scrap preheating chamber 10 are intercommunicated with each other through the elbow 14 extended from the roof 26 of the arc furnace 1, the exhaust-gas suction duct 13' and the duct 13 attached to the roof 11. The scrap preheating chamber 10 is communicated through the exhaust port 28 thereof and the exhaust duct 27 with the ventilation flue 31. When the fan 35 is driven under these conditions, the high-temperature gases produced in the arc furnace 1 are introduced into the scrap preheating chamber 10 so that the metal charge or scrap in the preheating chamber 10 is preheated. The exhaust gases are then discharged through the exhaust port 28 and the exhaust duct 27.

After the operation of the arc furnace 1, the power cylinder 30 is actuated so that the roof 11 of the preheating chamber 10 is lifted slightly away from the scrap preheating chamber 10. The roof 26 of the arc furnace 1 is lifted off and the molten metal is charged into the ladle 20. Then the carriage 9 and hence the scrap preheating chamber 10 is moved toward the arc furnace 1 and stopped immediately above the furnace 1. Thereafter the power cylinder 23 is so actuated that its piston rod 24 is extended and consequently the bottom parts 22 are opened, whereby the preheated scraps are charged from the preheating chamber 10 into the arc furnace 1. In this case, the damper 34 in the exhaust duct 27 is closed.

After the preheated metal charge has been charged into the arc furnace 1, the door 5 is opened so that the preheating chamber 10 is moved along the rail 8 out of the shroud 2 to the scrap yard B. New scrap is then charged into the scrap preheating chamber 10 from a scrap bucket 36 or by means of a scrap charging conveyor (not shown). Thereafter the scrap preheating chamber 10 is moved along the horizontal rail 8 into the shroud 2. In this case the arc furnace 1 is closed with the roof 26. The scrap preheating chamber 10 is brought to the position as shown in FIG. 4 so that the lower end of the exhaust-gas suction duct 13' of the scrap preheating chamber 10 is communicated or engaged with the elbow 14 extended from the roof 26 of the arc furnace 1. Thereafter the roof 11 is lowered so as to air-tightly seal the upper opening of the scrap preheating chamber 10. The damper 34 is opened again and the operation of the arc furnace 1 is started again. Therefore the newly charged scrap in the scrap preheating chamber 10 is preheated in the manner described above.

The molten metal is charged from the arc furnace 1 into the ladle 20 on the carriage 19. The carrier 19 transports the ladle 20 to the casting yard A and then the ladle 20 is lifted to the casting position in the manner described before. During the movement of the carriage 19 out of or into the shroud 2, the door 7 of the opening 6 is of course kept opened.

In the second embodiment described so far with reference to FIG. 4, while the scrap in the preheating chamber 10 is being preheated, the exhaust gases from the arc furnace 1 is discharged by the fan 35 through the exhaust port 28 of the chamber 10, the exhaust duct 27 and the damper 34 into the ventilation flue 31. Alternatively, the fan 35 may be disposed within the shroud 2 and the upper end of the exhaust duct 27 may be opened within the shroud 2. Then the gases which have preheated the metal charge in the scrap preheating chamber 10 may be discharged into the shroud 2 and dilluted with the air in the shroud 2. The dilluted exhaust gases are discharged through the ventilation hole 32 and the ventilation flue 31. Therefore, explosions of exhaust gases may be prevented. That is, the temperature of CO is lowered and the concentration of CO is also lowered because the exhaust gases are mixed with the air. As a result, CO can be processed safely and the production of $NO_x$ can be minimized.

Figure 5:
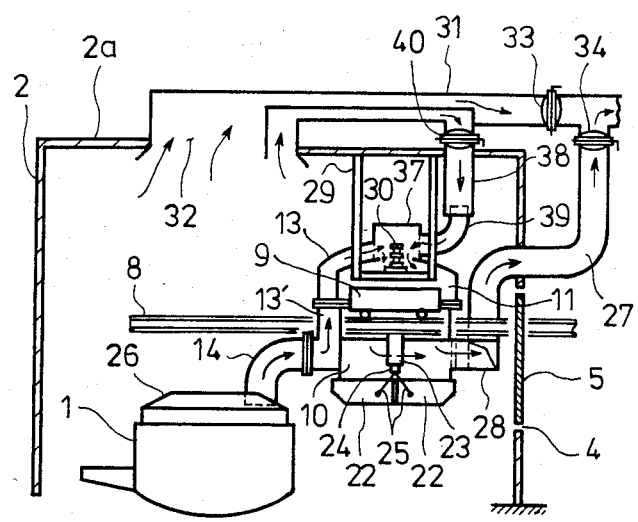
FIG. 5 shows a third embodiment of the present invention.

According to the second embodiment, the metal charge in the scrap preheating chamber 10 is preheated only by the exhaust gases discharged from the arc furnac 1, but according to a third embodiment as shown in FIG. 5, a combustion chamber 37 is provided on the roof 11 of the scrap preheating chamber 10 so that the exhaust gases discharged from the arc furnace 1 may be burned. That is, the duct 13 of the roof 11 is communicated with the combustion chamber 37 which in turn is communicated with one end of a duct 39 the other end of which is communicated with one end of an air duct 38 for sucking the air from the shroud 2 adjacent to the roof 2a thereof and charging the air into the combustion chamber 37. As described previously, the lower end of the duct 13 is communicated or engaged with the upper end of the exhaust-gas suction duct 13' of the scrap preheating chamber 10. When the roof 11 air-tightly seals the upper opening of the scrap preheating chamber 10, the arc furnace 1 is communicated with the combustion chamber 37 through the elbow 14, the exhaust-gas suction duct 13' and the duct 13. The combustion chamber 37 is also communicated with the shroud 2 through the air duct 38 and the duct 39. Therefore, the exhaust gases charged into the combustion chamber 37 are mixed with the air introduced through the air duct 38 and the duct 39 and burned. The products of combustion are then charged into the scrap preheating chamber 10 and preheat the metal charge therein and are discharged through the exhaust port 28 and the duct 27. In order to control the flow rate of the air to be introduced into the combustion chamber 37, a damper 40 is disposed within the air duct 38.

So far the present invention has been described with conjunction with its preferred embodiments, but it is to be understood that the present invention is not limited thereto and that various modifications may be effected without leaving the true spirit of the present invention.

The effects, features and advantages of the present invention may be summarized as follows:

(i) The arc furnace is enclosed with the shroud and the scrap preheating chamber can be moved horizontally into or out of the shroud through the opening of one side wall of the shroud. That is, it suffices to provide only one opening in the shroud. As a result, the area of the opening of the shroud can be remarkably reduced as compared with the prior art shrouds and consequently it becomes easy to prevent the leakage of smoke from the shroud. In addition, the air flow rate of the ventilation system can be decreased so that the capacity of the dust collection system can be decreased accordingly and consequently the running or operation cost can be reduced.

(ii) A crane for charging scrap can be eliminated and it suffices only to provide a hoist for maintenance purpose within the shroud so that the conventional buildings for arc furnace can be eliminated or considerably modified.

(iii) Since the shroud has no notches or cut-out portions, it can have a sufficiently high degree of rigidity. To put into another way, the shroud with a high degree of rigidity can be constructed with materials having relatively low mechanical strength.

(iv) The charging of scrap into the scrap preheating chamber can be carried out outside of the shroud and then the charged scrap preheating chamber is moved horizontally into the shroud. Therefore it is not needed to lift the scrap preheating chamber by a crane to the top of the arc furnace. As a result, it is not needed to provide an elongated opening such as shown at d in FIG. 1 and consequently the difficult operation for passing the wire rope through the narrow elongated opening of the shroud can be eliminated. Thus, the erroneous operation of the scrap charging bucket can be avoided; that is, the collision of the scrap charging bucket or the like against the shroud or the arc furnace can be avoided. According to the present invention, the preheated scrap can be correctly charged into the arc furnace without causing any damage.

(v) The exhaust gases discharged from the arc furnace are used to preheat the scrap. That is, the high-temperature gases produced during the melting and refining stages can be utilized to preheat the metal charge. As a result, the required electric power for melting a unit weight of scraps can be decreased and consequently the running or operation cost can be reduced.

(vi) By the horizontal movement of the scrap preheating chamber into and out of the shroud, the preheated scrap can be directly charged into the arc furnace so that the temperature drop of the preheated scrap during the charging step can be reduced to a minimum. Therefore, the transfer of preheated scrap by a crane through a steel foundry can be eliminated so that no white smoke and offensive odor are emitted.

(vii) When the exhaust gases, which are used to preheat the scrap, are discharged into the shroud, they are dilluted by the air in the shroud and then discharged through the ventilation flue. Therefore, the danger of explosion of exhaust gases can be avoided. That is, the temperature as well as the concentration of CO contained in the exhaust gases can be lowered because it is mixed with the air in the shroud. Therefore, the exhaust gases and more particularly CO can be discharged out of the shroud safely and easily without the need of a combustion process.

(viii) The combustion chamber is installed above and communicated with the roof of the scrap preheating chamber and the exhaust gases discharged from the arc furnace are introduced into the combustion chamber and burned. The products of combustion flow through the metal charge in the scrap preheating chamber, whereby a high degree of preheating effect can be attained. Since CO contained in the exhaust gases is completely burned in the combustion chamber, the danger of explosion can be avoided and the discharge of $NO_x$ can be minimized. The air of relatively high temperature in the shroud is introduced into the combustion chamber so that the positive ignition of exhaust gases can be ensured. Thus, a high degree of thermal efficiency can be attained.

What is claimed is:

1. An arc furnace installation with a shroud, wherein said arc furnace is air-tightly enclosed within said shroud; one side wall of said shroud is provided with a door through which a scrap heating chamber is horizontally moved into or out of said shroud; and a means is provided for bringing said scrap heating chamber to a first position immediately above said arc furnace, said means being also operable to selectively bring said scrap heating chamber to a scrap preheating position within said shroud but spaced away from said arc furnace by a predetermined distance and a scrap charging position outside of said shroud, whereby scraps are charged into said scrap preheating chamber at said scrap charging position and preheated at said scrap preheating position and then charged into said arc furnace at said first position.

2. An installation according to claim 1 wherein a side wall adjacent to a casting yard of said shroud is provided with a door through which molten steel or metal discharged from said arc furnace is transferred into said casting yard, and a means is provided which transfers said molten steel or metal discharged from said arc furnace into said casting yard.

3. An installation according to claim 1 wherein a bottom of said scrap preheating chamber is adapted to be opened, and said scrap preheating chamber is supported by a carriage for horizontal displacement of said scrap preheating chamber.

4. An installation according to claim 1 wherein said scrap preheating chamber is communicated with said arc furnace through duct means during operation of said arc furnace so that the scraps in said scrap preheating chamber are preheated by exhaust gases discharged from said arc furnace.

5. An installation according to claim 4 wherein the exhaust gases which have been utilized for preheating said scraps in said scrap preheating chamber are discharged into said shroud.

6. An installation according to claim 1 wherein a roof or cover means is disposed within said shroud and is adapted to air-tightly close an upper opening of said scrap preheating chamber during operation of said arc furnace.

7. An installation according to claim 6 wherein said roof or cover means is provided with a combustion chamber which is adapted to communicate with said arc furnace and the inside of said shroud through duct means during operation of said arc furnace so that exhaust gases from said arc furnace and air inside said shroud are introduced into said combustion chamber, whereby the exhaust gases are burned in said combustion chamber and products of combustion are forced into said scrap preheating chamber.

* * * * *